United States Patent [19]

Fischer et al.

[11] Patent Number: 4,575,289
[45] Date of Patent: Mar. 11, 1986

[54] APPARATUS FOR ORIENTING THE POSITION OF A MACHINE TOOL CARRIAGE RELATIVE TO A STATIONARY MACHINE PART

[75] Inventors: Heinrich Fischer, Munich; Walter Schmidkunz, Eichenau; Johann Spensberger, Poing, all of Fed. Rep. of Germany

[73] Assignee: Carl Hurth Maschinen- und Zahnradfabrik GmbH & Co., Munich, Fed. Rep. of Germany

[21] Appl. No.: 632,560

[22] Filed: Jul. 19, 1984

[30] Foreign Application Priority Data

Aug. 4, 1983 [DE] Fed. Rep. of Germany ....... 3328177
Mar. 23, 1984 [DE] Fed. Rep. of Germany ....... 3410686

[51] Int. Cl.$^4$ ............................................. B23F 19/06
[52] U.S. Cl. ........................................ 409/33; 72/101; 409/37; 409/49
[58] Field of Search ............... 409/33, 37, 49; 72/101, 72/102

[56] References Cited

U.S. PATENT DOCUMENTS 2,660,929 12/1953 Praeg ..................... 409/33
3,289,536 12/1966 Hurth ..................... 409/33
4,359,301 11/1982 Spensberger et al. ............ 409/49 X
4,477,214 10/1984 Spensberger ..................... 409/49 X
4,502,822 3/1985 Fischer ............................. 409/33 X

FOREIGN PATENT DOCUMENTS 2714706 10/1978 Fed. Rep. of Germany.

Primary Examiner—Fred Silverberg
Attorney, Agent, or Firm—Flynn, Thiel, Boutell & Tanis

[57] ABSTRACT

An apparatus for orienting the position of a machine tool carriage relative to a stationary machine part, which machine tool carriage is movable in a plane defined by orthogonally related X and Y axes. In a first embodiment, the carriage is freely movable on a holder parallel with respect to the X axis and the holder is arranged freely movably in the stationary machine part parallel with respect to the Y axis. In a different embodiment, two pairs of steering knuckle arms are provided and which are arranged symmetrically with respect to the carriage. Each pair of arms consists of two hingedly connected steering knuckle arms which define a right angle with one of each thereof being hinged to the carriage, the other one to the stationary machine part. Two modifications are described for the design of the joints. The apparatus can be used, for example in machines for the precision working of gears.

6 Claims, 6 Drawing Figures

APPARATUS FOR ORIENTING THE POSITION OF A MACHINE TOOL CARRIAGE RELATIVE TO A STATIONARY MACHINE PART

FIELD OF THE INVENTION

The invention relates to an apparatus for orienting the position of a carriage of a machine tool relative to a stationary machine part, which carriage is movable in a plane which is defined by orthogonally related X and Y axes.

BACKGROUND OF THE INVENTION

In various machine tools, a feed carriage or the like, which can be moved back and forth and which swingably supports a tool head, is swingably mounted on a different machine part, which in turn can be mounted on a third part, whereby all mentioned swivel axes are directed parallel to one another. The feed carriage thereby has no relationship to a stationary part, for example to the said third part, which makes the adjustment of the swivel angles of the tool head and/or of the feed carriage or the like more difficult.

It is known from German OS No. 27 14 706 to hinge each of two steering knuckle arms on the machine column and at a right angle thereto on a carriage which is to be held in a constant position relative to the machine column and to connect the free ends of the steering knuckle arms through a common steering plate. The short bearing distances within the bearing points permit only with extremely high, economically not feasible manufacturing and installation expense a stiffness or rigidity which corresponds with the precision requirements.

Therefore, the basic purpose of the invention is to provide an apparatus of the above-mentioned type such that the said angles of traverse can be adjusted completely separately from one another and thereby the friction which is to be overcome during movement of the carriage is as small as possible and the required stiffness or rigidity is given in every position of the carriage.

In various gear-precision working machines, for example gear shaving machines, a crossed-axes angle must be adjusted between the workpiece (gear) which is to be worked and the tool, for example shaving gear, meshed therewith, for which purpose the tool head is rotated in the feed carriage. Furthermore, if for example work is done according to the so-called diagonal method, a diagonal angle must be adjusted, which determines the feeding or advancing direction between the tool and workpiece. For this the part which receives the feed carriage must be rotated relative to the said third part. Since all adjusting operations must be carried out on parts which are in direct connection with the feed carriage, same, however, is not supposed to be rotated due to difficulties which can occur during the setting of the machine, since the first adjusted angle must be added or subtracted during the second angle adjustment, which easily results in adjusting errors. For machines with numerically controlled adjustment, each angle must be able to be called by itself, calculation operations are thereby to be avoided. It also happens that during adjustment of the second angle, the first angle is again changed. These disadvantages are avoided with the inventive apparatus.

BRIEF DESCRIPTION OF THE DRAWINGS

The invention will be described hereinafter with reference to three exemplary embodiments which are illustrated in six figures.

In the drawings.

DETAILED DESCRIPTION

Figure 1:
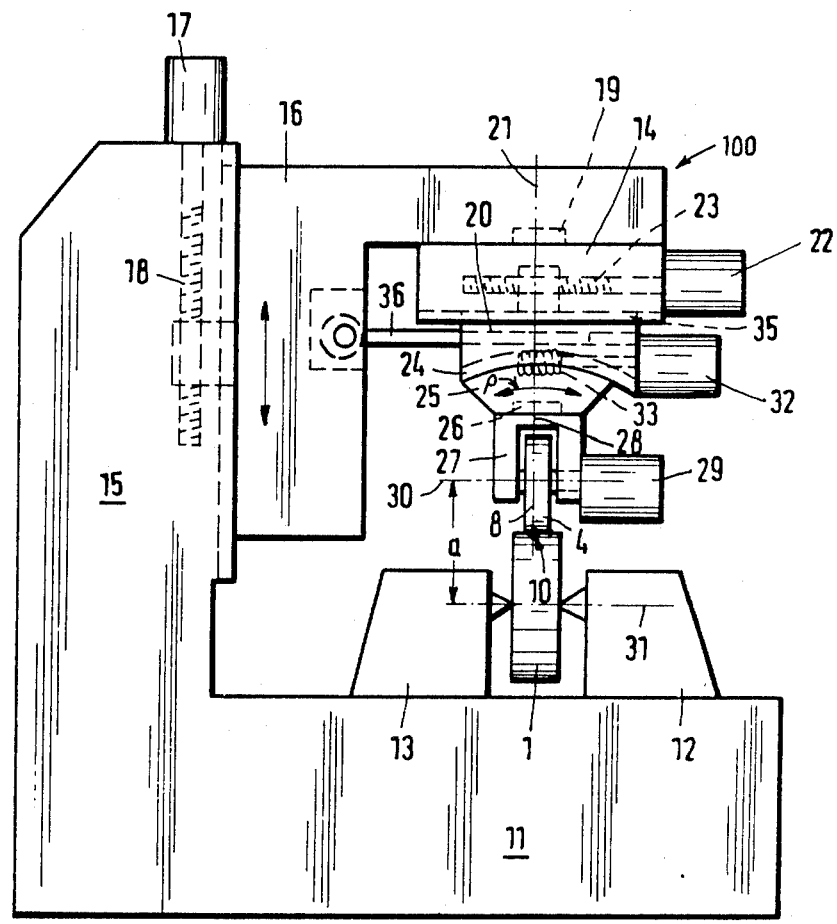
FIG. 1 is a schematic view of a gear shaving machine embodying the invention.

In FIG. 1, a gear 1 (workpiece) is rotatably mounted between tailstocks 12, 13 located on a bed 11 of the gear shaving machine 100. A first feed carriage 16 (also known as a vertical plunge carriage as well as a vertical carriage) is vertically movably arranged on a column 15 and can be moved vertically parallel with respect to the Z axis for purposes of adjusting a center distance between the axes of rotation of a shaving gear tool 14 and the workpiece 1. A drive motor 17 and a spindle 18 are provided for effecting the aforesaid movement of the feed carriage 16. A swivel plate 14 is rotatably mounted for movement about a vertical axis 21 in a circular guide 19. A second feed carriage 20 is mounted on the underside of the swivel plate 14 for back-and-forth movement in the horizontal direction (arrow R in FIG. 2) relative to the first feed carrriage 16, for which purpose a motor 22 and a spindle 23 are provided. The second feed carriage 20 is connected to the first feed carriage 16 through a holder 36, which will be described in more detail hereinbelow, and in such a manner, that the second feed carriage is not rotatable about an upright vertical axis 21. The second feed carriage therefore has a guideway 35 in the swivel plate 14, which guideway 35 is rotationally movable about the vertical axis 21 with the swivel plate 14.

A cradle 25 is arranged in an arched guide 24 on the underside of the second feed carriage 20, on which cradle a tool head 27 is rotatably adjustably mounted for movement about a vertical axis 28 in a circular guide 26. A shaving gear 4 functioning as a tool is rotatably supported and is driven by a motor 29 in a tool head 27. The vertical axis 21 and, in the illustrated position of the cradle 25, also the axis 28 extend parallel with respect to the Z axis. They are aligned with one another and lie in the center rotational plane 8 of the shaving gear 4.

The cradle 25 with the tool head 27 and the shaving gear 4 are pivotal about an axis 10 in the arched guide 24. A motor 32 and an associated worm drive 33 are provided for this pivoting movement ρ for producing a crowned tooth shape. By rotating the tool head 27 about the axis 28, a crossed-axes angle γ between the axis of rotation 30 of the shaving gear 4 and the axis of rotation 31 of the workpiece 1 is adjusted. The axes 30 and 31 each lie in planes which are parallel to one another and to a plane defined by the X and Y coordinates. By rotating the second feed carriage 20 about the vertical axis 21, the diagonal angle Φ (FIG. 2) and thus the feed direction of the shaving gear 4 is adjusted. That is, the feed direction can be adjusted so that shaving is not supposed to take place by the parallel method (feed direction R lies in the plane of the drawing for FIG. 1, namely parallel to the X axis), but instead, is to take place by the diagonal method (feed direction R lies inclined with respect to the plane of the drawing for FIG. 1, namely as shown in FIG. 2).

Figure 2:
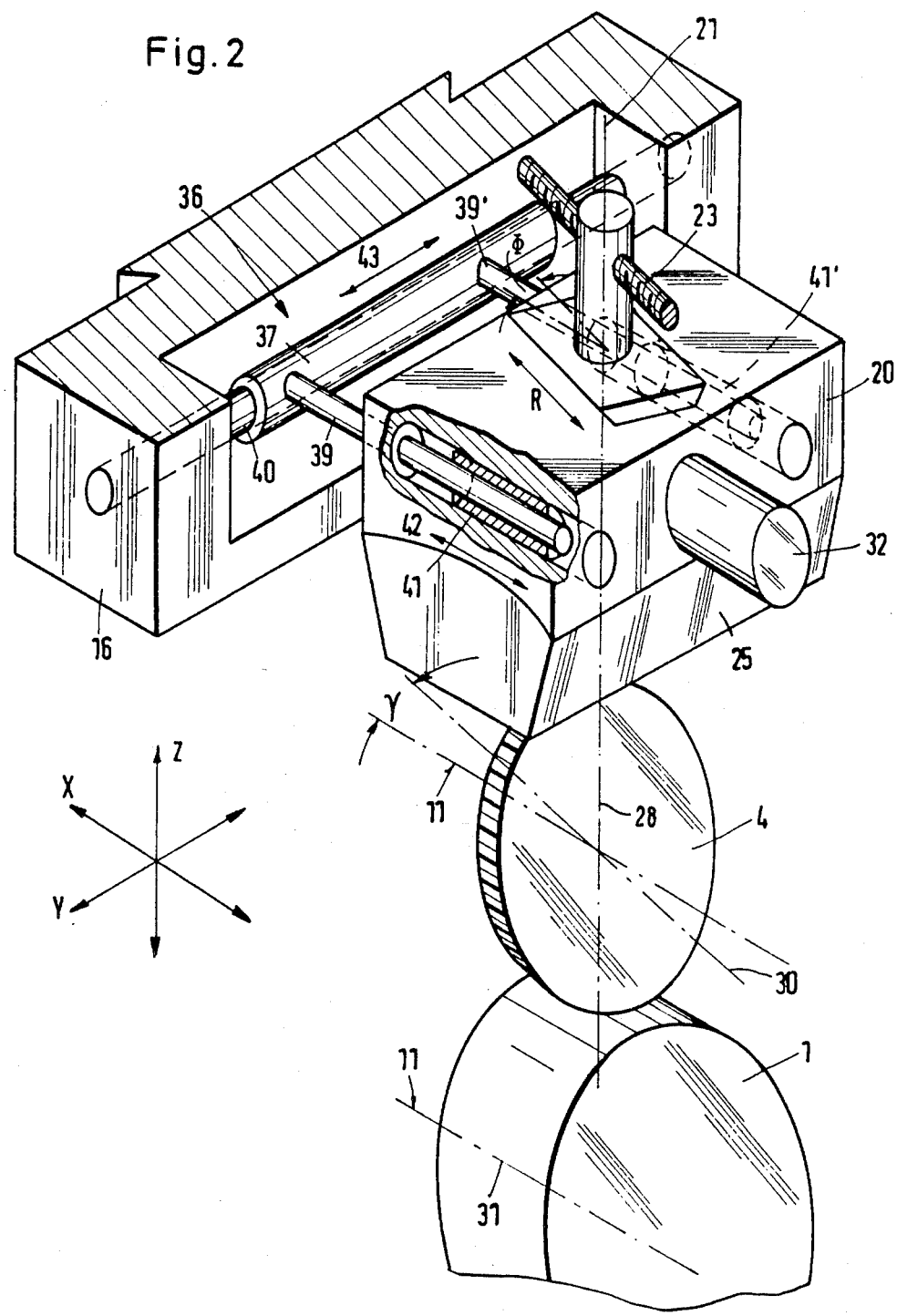
FIG. 2 is an enlarged perspective view of a feed carriage structure illustrated in FIG. 1.

The holder 36 consists substantially of a hollow guide sleeve 37 having two guide rods 39, 39' secured thereto and extending parallel to one another (FIG. 2). The guide sleeve 37 is supported freely movable in a direction parallel with respect to the Y axis on a guide rod 40 which is provided on the second feed carriage 16 (arrow 43), for which purpose the sleeve 37 has internally thereof suitable sliding sleeves or roller bearings. The second feed carriage 20 is supported freely movable in a direction parallel with respect to the workpiece axis 31 and thus with respect to the X axis on the guide rods 39, 39'. To facilitate this sliding movement, the openings in the second feed carriage have guide sleeves 41, 41', which have in their bores suitable sliding or bushing sleeves or roller bearings. The axes of the guide rods 39, 39', 40 can all lie in the same plane or in planes which are parallel to one another. The guide rods 39, 39' lie at a right angle with respect to the guide rod 40.

If now the second feed carriage 20 is to carry out a tool feeding movement in a direction which is determined by the diagonal angle $\Phi$ which is adjusted by an angular movement of the swivel plate 14, then it follows that the second feed carriage will maintain its original position relative to the workpiece axis 31 due to its relation to the rotationally movable guide 35 and will move in the pregiven direction (arrow direction R in FIG. 2). The guide sleeves 41, 41' thereby move on the guide rods 39, 39' and the guide sleeve 37 moves on the guide rod 40. These movements in the arrow directions 42, 43 result from the movement in arrow direction R and the adjustment of the diagonal angle $\Phi$.

The design of the machine is not limited to the described example. For example the holder 36 can have two parallel guide sleeves 37, which are guided on two parallel guide rods 40. Also each of the guide rods 39, 39' can be inserted in two or more guide sleeves. Aside from this the invention can also be applied to other designs than the one of the shaving machine illustrated in FIG. 1.

Figure 3:
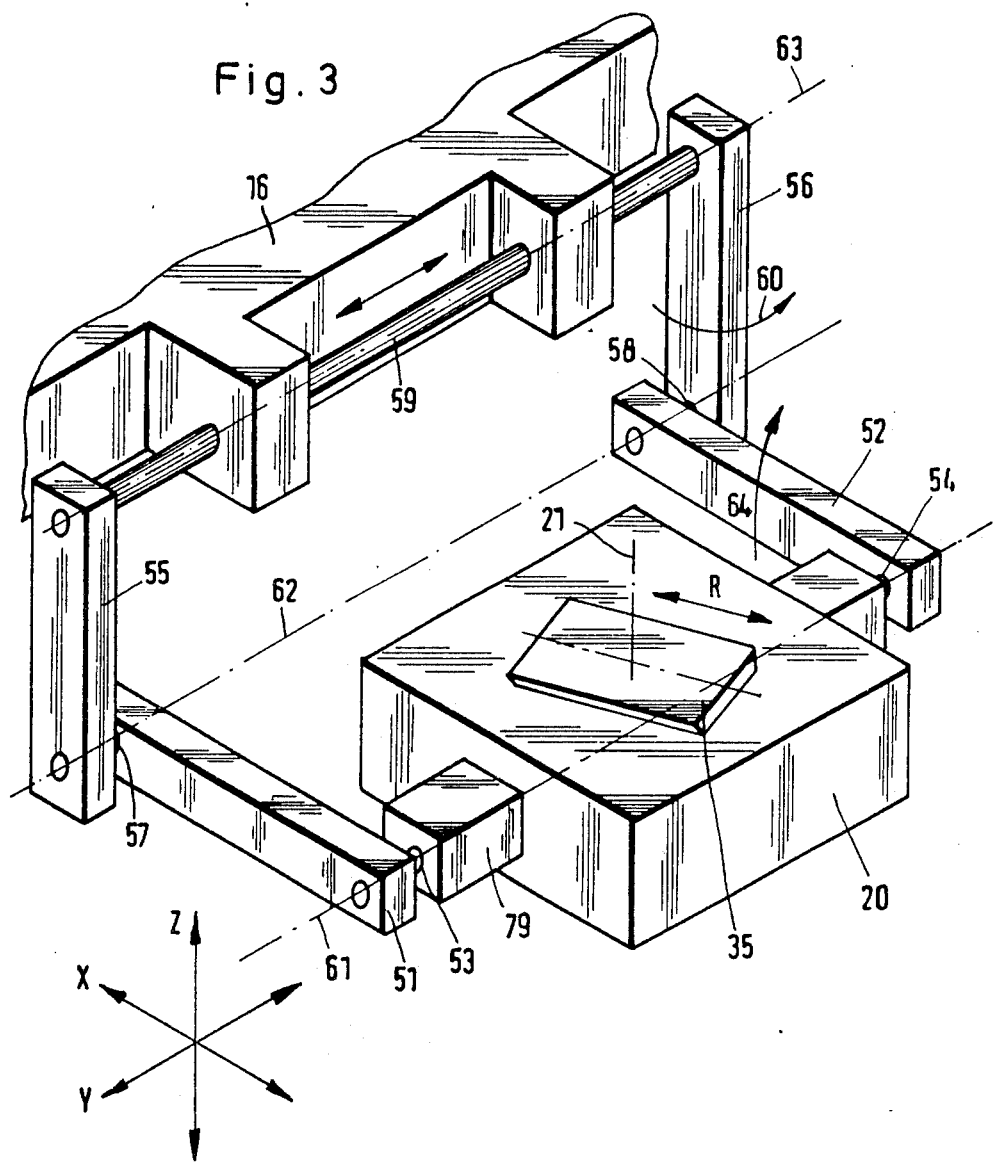
FIG. 3 is an enlarged perspective view of a further embodiment of the invention.

A different design of a parallel guide for the second feed carriage 20 movable in a plane which is defined by the X and Y axes is shown in FIG. 3. On the upper side of the guide there is provided a guideway similar to the guideway 35 in FIG. 1, which guideway 35 can be adjusted rotationally about a vertical axis 21 extending parallel with respect to the Z axis. First steering knuckle arms 51, 52 are hingedly connected (through joints 53, 54) parallel to one another on opposite sides of the second feed carriage. The arms 51, 52 are connected through joints 57, 58 to two steering knuckle arms 55, 56. The second-mentioned steering knuckle arms 55, 56 are fixedly secured to a common guide rod 59 rotatably mounted for movement about an axis 63 (arrow 60) and axially movably mounted for movement in a direction parallel to the Y axis on a machine part which is non-movable relative to the second feed carriage 20. This part can be the machine column or a part rigidly connected to it or the feed carriage 16 which is movable parallel to the Z axis oriented perpendicularly with respect to the plane defined by the X and Y axes. The axis 61 of the joints 53, 54, the axis 62 of the joints 57, 58 and the axis 63 of the guide rod 59 extend parallel to the Y axis. The steering knuckle arms 51 and 55 and the steering knuckle arms 52 and 56 lie thus in planes which are parallel to the plane defined by the X and Z axes and form, in the initial position of the carriage 20, at least approximately right angles to each other. If now the carriage 20 is moved in the X-Y plane by the motor 22 and the spindle 23 comparable to the components illustrated in FIG. 1, for example in the arrow direction R to the right in the sense of FIG. 3, then the following happens. The steering knuckle arms 51, 52 remain parallel to one another and to the X axis. Corresponding with the X component which results from a movement in the direction R, they effect a pivoting of the second steering knuckle arms 55, 56 counterclockwise about the axis 63 in the arrow direction 60, whereby the first steering knuckle arms 51, 52 are pivoted clockwise at a corresponding amount about the axis 61 in the arrow direction 64. The steering knuckle arm 51 presses at the same time the steering knuckle arm 55 and the steering knuckle arm 52 pulls the steering knuckle arm 56 together with the guide rod 59 to the right corresponding with the Y component which results from the movement R. If a reverse movement in the arrow direction R occurs, namely to the left in the sense of FIG. 3, then also all pivoting, pushing and pulling movements occur in the opposite direction. In all cases the steering knuckle arms 51, 52, 55, 56 remain parallel to planes defined by the X and Z axes. A rotation of the carriage 20 about an axis which is parallel with respect to the Z axis is prevented by the steering knuckle arms and by the guide rod 59. Thus the carriage 20 can change its position relative to the feed carriage 16 or the machine column, however, not its orientation about the vertical axis 21.

Figure 4:
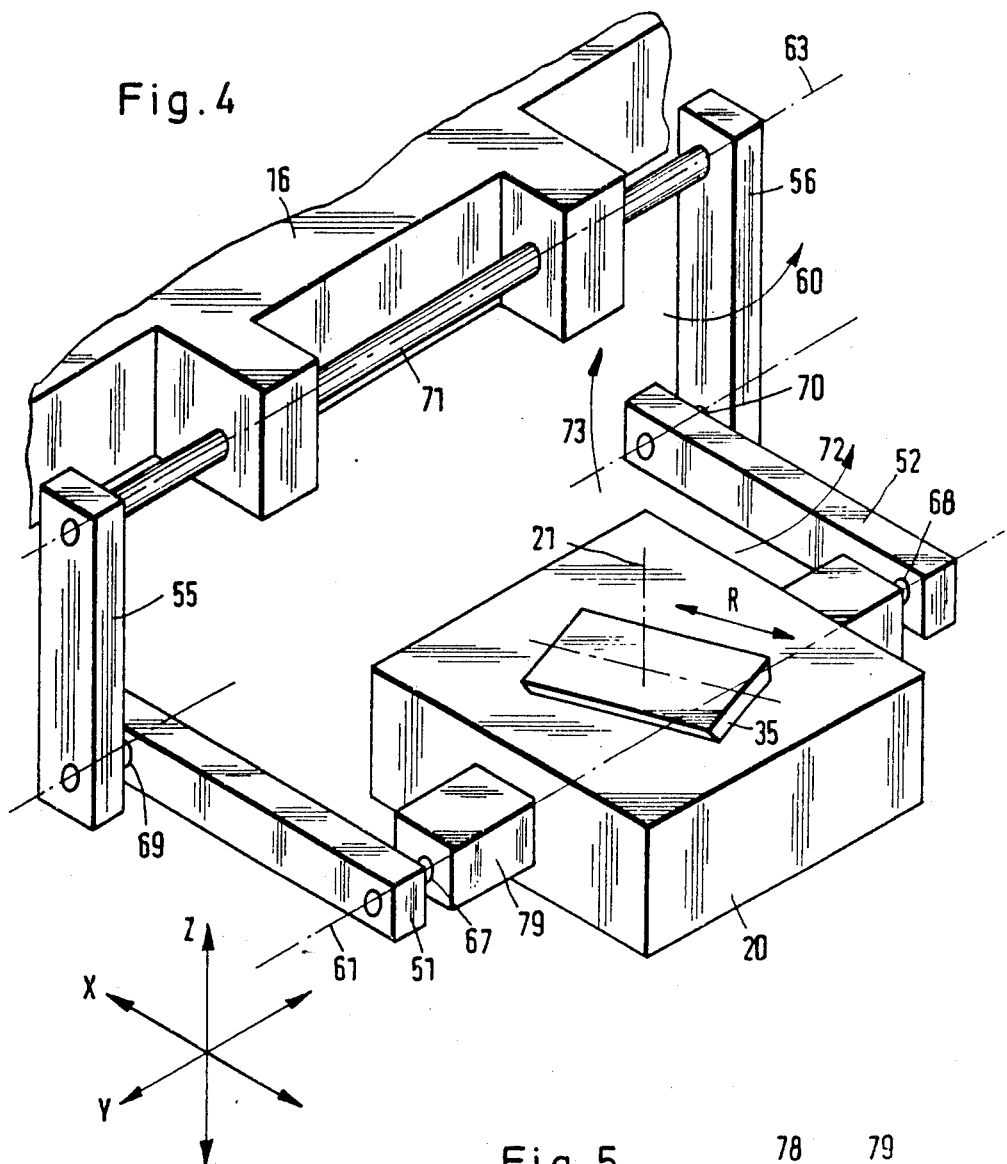
FIG. 4 is an enlarged perspective view of a further embodiment of the invention.

A slightly different design is shown in FIG. 4. The arrangement of the second feed carriage 20, its guide 35, the steering knuckle arms 51, 52, 55, 56 and the machine column or the feed carriage 16 correspond to the arrangement of FIG. 3. Different is the connection of these parts to one another. Between the carriage 20 and the steering knuckle arms 51, 52 on the one hand and between the steering knuckle arms 51, 52 and the steering knuckle arms 55, 56 on the other hand, ball-and-socket joints 67, 68 or 69, 70 are arranged which permit an inclination of the steering knuckle arms 51, 52 relative to the carriage 20 and to the steering knuckle arms 55, 56 in each spacial direction. The two steering knuckle arms 55, 56 are fixedly secured against rotation on a common shaft 71. The shaft 71 is rotatably supported for movement about the axis 63 which extends parallel to the Y axis (arrow 60), however, is not capable of movement axially thereof in the machine column or the feed carriage 16.

In the initial position of the carriage 20, the steering knuckle arms 51 and 55 and the steering knuckle arms 52 and 56 lie again in the planes which are defined by the X and Z axes and form at least approximately a right angle. It is thereby not necessary (also not in the embodiment according to FIG. 3) that the steering knuckle arms 51, 52 be arranged horizontally and the steering knuckle arms 55, 56 be arranged vertically, because these directions can also be exchanged.

If now the second feed carriage 20 is moved in the X-Y plane, for example in the arrow direction R to the right in the sense of FIG. 4, then the steering knuckle arms 51, 52 do remain parallel to one another, however, not with respect to the X axis. Corresponding with the Y component which results from the movement R they swing out in the ball-and-socket joints 69, 70 (arrow 72) and take on an inclined position with respect to the X axis. At the same time they pivot the second steering knuckle arms 55, 56 counterclockwise about the axis 63 in the arrow direction 60, whereby the first steering knuckle arms 51, 52 are pivoted clockwise the same amount in the ball-and-socket joints 67, 68 in the arrow direction 73. Thus, while the steering knuckle arms 55, 56 are only swung in the planes which are defined by the X and Z axes, the shaft 71 being axially fixed causes the steering knuckle arms 51, 52 to constantly change their position with respect to the X, Y and Z axes during the course of the movement R. If the movement in the arrow direction R occurs in the opposite direction, namely to the left in the sense of FIG. 4, then also the swinging or pivoting movements occur in the opposite direction. In all cases the steering knuckle arms 51, 52 remain parallel to one another in constantly changing planes and the steering knuckle levers 55, 56 remain parallel to one another in planes which are defined by the X-Z axes. A rotation of the carriage 20 about an axis which is parallel with respect to the Z axis is thus not possible, so that the carriage 20 can change its position relative to the feed carriage 16 or the machine column, however, not its orientation about the vertical axis 21.

Figure 5:
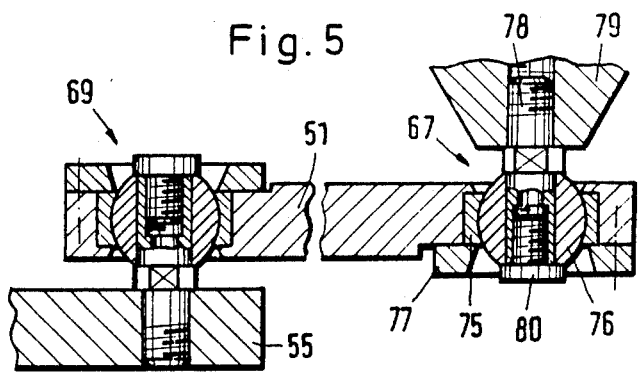
FIG. 5 is a partial cross-sectional view of the steering knuckle arm of FIG. 4 with the ball-and-socket joints.

For a better understanding as to how the ball-and-socket joints are arranged, FIG. 5 illustrates an installation of the ball-and-socket joints 67, 69 into the steering knuckle arm 51. The outer rings 75 of the ball-and-socket joints 67, 69 are received in suitable recesses in the steering knuckle arm 51 and the ball-and-socket joints are held in place by the holding plates 77. The spherical inner rings or balls 76 are mounted on bolts 78 which are screwed into a shoulder 79 of the carriage 20 or into the second steering knuckle arm 55. The inner rings or balls operatively engage the outer rings 75 and are held by means of screws 80. This arrangement is only an exemplary embodiment, which can be varied as desired.

Figure 6:
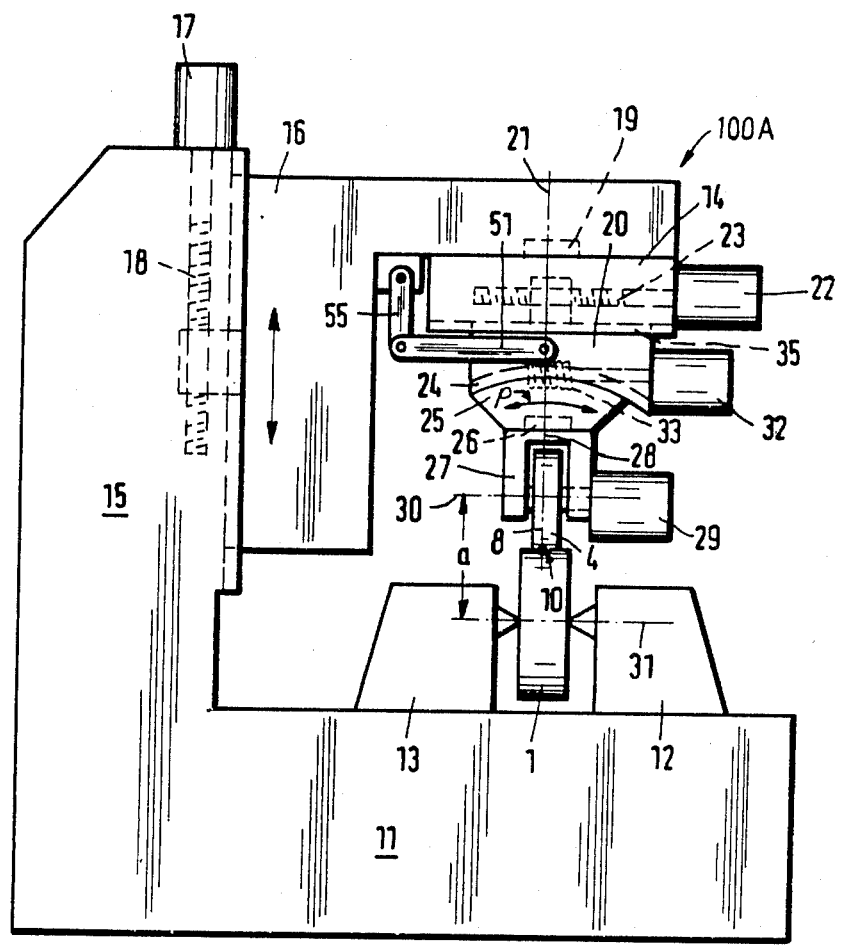
FIG. 6 illustrates a gear shaving machine, in which the apparatus of FIGS. 3 and 4 are used.

FIG. 6 again illustrates a gear shaving machine 100A of the type of construction illustrated in FIG. 1, however, in place of the holder 36 the embodiment with the steering knuckle arms 51, 52, 55, 56 is shown. All remaining reference numerals correspond with the ones of FIG. 1, so that the machine does not need to be described again. Only one of the steering knuckle arms 51, 52 (here arm 51) can be seen in FIG. 6 and is hingedly connected to the second steering knuckle arm 55. The steering knuckle arm 55 is connected to the feed carriage 16 through the guide rod 59 or the shaft 71. If now the feed carriage 20 is to carry out a feeding movement in a direction which is determined by the diagonal angle which is adjusted with the swivel plate 14, then it follows that the pregiven direction will prevail (arrow direction R) while maintaining its original position relative to the workpiece axis 31 or relative to the feed carriage 16 due to its rotationally movable guide 35. The movements of the steering knuckle arms 51, 52, 55, 56 which result therefrom have already been described above.

The embodiments of the invention in which an exclusive property or privilege is claimed are defined as follows:

1. In an apparatus for orienting the position of a feed carriage of a machine tool relative to a stationary machine part, said feed carriage being movable in a plane defined by orthogonally related X and Y axes, the improvement comprising: a holding means movably mounted on said stationary machine part, said holding means including a first guide rod mounted on said stationary machine part, a guide sleeve reciprocally movably mounted on said first guide rod, at least one second guide rod mounted on said guide sleeve, said first and said second guide rods extending perpendicularly with respect to one another in said plane, said plane also being parallel with respect to an axis of rotation of a workpiece and with respect to a feed direction (R), said feed carriage being supported for movement along said second guide rod.

2. The apparatus according to claim 1, including its use in a machine for the precision working of tooth flanks of toothed workpieces with a rotating, gearlike tool, wherein a first guide part is provided on said feed carriage and a second guide part is provided on said machine part and guides therein said first guide part for longitudinal movement, said first guide part being rotatable with respect to said carriage about an axis which is parallel with respect to said Z axis.

3. In an apparatus for orienting the position of a feed carriage of a machine tool relative to a stationary part, said feed carriage being movable in a plane defined by orthogonally related X and Y axes, the improvement comprising: first steering knuckle arms hingedly connected to two oppositely lying sides of said feed carriage, at the free ends of each is hinged a second steering knuckle arm, and wherein said second steering knuckle arms are fixedly secured at their other end against rotation to a common guide rod, which is rotatably supported and movable parallel with respect to said Y axis on said stationary machine part, whereby said first and second steering knuckle arms define in the initial position of said feed carriage at least approximately a right angle, which lies in a plane which is defined by orthogonally related X and Z axes, said Z axis being perpendicular to said X-Y plane.

4. The apparatus according to claim 3, including its use in a machine for the precision working of tooth flanks of toothed workpieces with a rotating, gearlike tool, wherein a first guide part is provided on said feed carriage and a second guide part is provided on said machine part and guides therein said first guide part for longitudinal movement, said first guide part being rotatable with respect to said feed carriage about an axis which is parallel with respect to said Z axis.

5. In an apparatus for orienting the position of a feed carriage of a machine tool relative to a stationary machine part, said feed carriage being movable in a plane defined by orthogonally related X and Y axes, the improvement comprising: first steering knuckle arms hingedly connected to two oppositely lying sides of said feed carriage, at the free ends of each is hinged a second steering knuckle arm, plural ball-and-socket joints connecting said knuckle arms and said feed carriage, and wherein said second steering knuckle arms are secured at their other end fixed to and against rotation with respect to a common shaft supported on said stationary machine part, said common shaft being pivotal about an axis which is directed parallel with respect to said Y axis, whereby said first and second steering knuckle arms define in an initial position of said feed carriage at least approximately a right angle, which lies in a plane which is defined by orthogonally related X and Z axes, said Z axis being perpendicular to said X-Y plane.

6. The apparatus according to claim 5, including its use in a machine for the precision working of tooth flanks of toothed workpieces with a rotating, gear-like tool, wherein a first guide part is provided on said feed carriage and a second guide part is provided on said machine part and guides therein said first guide part for longitudinal movement, said first guide part being rotatable with respect to said feed carriage about an axis which is parallel with respect to said Z axis.

* * * * *